(12) United States Patent
Mori

(10) Patent No.: US 10,757,640 B2
(45) Date of Patent: Aug. 25, 2020

(54) RADIO COMMUNICATION DEVICE, RADIO COMMUNICATION DEVICE CONTROL METHOD, AND RADIO COMMUNICATION SYSTEM FOR SCANNING TO FIND A BASE STATION FOR RADIO COMMUNICATION

(71) Applicant: KYOCERA CORPORATION, Kyoto (JP)

(72) Inventor: Daisuke Mori, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 3 days.

(21) Appl. No.: 16/143,209

(22) Filed: Sep. 26, 2018

(65) Prior Publication Data

US 2019/0028963 A1   Jan. 24, 2019

Related U.S. Application Data

(63) Continuation of application No. PCT/JP2017/032836, filed on Sep. 12, 2017.

(30) Foreign Application Priority Data

Dec. 6, 2016   (JP) .................................. 2016-236681

(51) Int. Cl.
*H04W 72/04*   (2009.01)
*H04W 48/16*   (2009.01)
(Continued)

(52) U.S. Cl.
CPC .......... *H04W 48/16* (2013.01); *H04W 52/02* (2013.01); *H04W 52/0206* (2013.01); *H04W 52/0241* (2013.01); *H04W 4/40* (2018.02); *H04W 88/02* (2013.01); *H04W 88/08* (2013.01); *Y02D 70/00* (2018.01)

(58) Field of Classification Search
CPC . H04W 48/16; H04W 52/0241; H04W 52/02; H04W 52/0206; H04W 88/02; H04W 88/08; H04W 4/40; Y02D 70/00
See application file for complete search history.

(56) References Cited

U.S. PATENT DOCUMENTS 5,627,882 A * 5/1997 Chien ............... H04W 52/0232
455/464
9,763,192 B1   9/2017 Vivanco et al.
(Continued)

FOREIGN PATENT DOCUMENTS

EP   1 765 023 A1   3/2007
JP   2003-108271 A   4/2003
(Continued)

*Primary Examiner* — Hassan Kizou
*Assistant Examiner* — Mahbubul Bar Chowdhury
(74) *Attorney, Agent, or Firm* — Studebaker & Brackett PC

(57) ABSTRACT

A radio communication device is mounted on a vehicle including a power source, and the radio communication device includes: a radio communication unit that performs radio communication with one or more base stations; and a control unit that causes the radio communication unit to scan to find the base station capable of performing radio communication, wherein the control unit changes a waiting time until a next scan according to an ON state or an OFF state of the power source in a case where the base station capable of performing radio communication is not found through the scan.

8 Claims, 3 Drawing Sheets

(51) Int. Cl.
*H04W 52/02* (2009.01)
*H04W 4/40* (2018.01)
*H04W 88/08* (2009.01)
*H04W 88/02* (2009.01)

(56) References Cited

U.S. PATENT DOCUMENTS

| | | | |
|---|---|---|---|
| 2004/0033812 A1* | 2/2004 | Matsunaga | G06F 1/263 |
| | | | 455/557 |
| 2004/0120278 A1 | 6/2004 | Krantz et al. | |
| 2005/0037791 A1* | 2/2005 | Zhang | H04W 52/0229 |
| | | | 455/515 |
| 2011/0136530 A1* | 6/2011 | Deshpande | H04W 24/10 |
| | | | 455/515 |
| 2017/0019837 A1* | 1/2017 | Katar | H04W 8/22 |

FOREIGN PATENT DOCUMENTS

| | | |
|---|---|---|
| JP | 2010-177949 A | 8/2010 |
| JP | 2013-513337 A | 4/2013 |
| WO | 2011/071751 A1 | 6/2011 |

\* cited by examiner

RADIO COMMUNICATION DEVICE, RADIO COMMUNICATION DEVICE CONTROL METHOD, AND RADIO COMMUNICATION SYSTEM FOR SCANNING TO FIND A BASE STATION FOR RADIO COMMUNICATION

CROSS-REFERENCE TO RELATED APPLICATION

This application claims priority from International Patent Application No. PCT/JP17/032836 filed on Sep. 12, 2017, the entire subject matter of which is incorporated herein by reference.

TECHNICAL FIELD

This disclosure relates to a radio communication device mounted on a vehicle including a power source, a radio communication device control method, and a radio communication system.

BACKGROUND ART

A telematics service that provides an information service in real time by combining a vehicle including cars and a communication system is known. In the telematics service, map data or Point Of Interest (POI) data for updating data of a navigation system is downloaded from the service center. In the telematics service, diagnostic information of an onboard device is uploaded to the service center. Such download and upload are performed by a radio communication module mounted on a vehicle by using a wireless network (for example, refer to JP 2010-177949).

Some radio communication devices including radio communication modules mounted on the vehicle correspond to a high speed communication such as Long Term Evolution (LTE). Some of such radio communication devices are equipped with a voice communication service Voice over LTE (VoLTE) function and a function for executing a program created by a user.

SUMMARY

This disclosure provides a radio communication device mounted on a vehicle including a power source and capable of enabling a user to comfortably use the vehicle, a method of controlling the radio communication device, and a radio communication system.

A radio communication device of this disclosure is mounted on a vehicle including a power source. The radio communication device includes a radio communication unit that performs radio communication with one or more base stations, and a control unit that causes the radio communication unit to scan for finding the base station capable of performing radio communication. The control unit changes a waiting time until a next scan according to an ON state or an OFF state of the power source in a case where the base station capable of performing radio communication is not found through the scan.

In the radio communication device of this disclosure, when the power source in the OFF state is changed from a within-range state where the radio communication with the base station is possible to an out-of-range state where the radio communication with the base station is not possible, the control unit may cause the radio communication unit to perform the scan after waiting by the waiting time according to the OFF state of the power source.

In the radio communication device of this disclosure, when the power source in the ON state is changed from a within-range state where the radio communication with the base station is possible to an out-of-range state where the radio communication with the base station is not possible, the control unit may cause the radio communication unit to perform the scan after waiting by the waiting time according to the ON state of the power source.

In the radio communication device of this disclosure, the waiting time according to the OFF state of the power source may be a first predetermined time and the waiting time according to the ON state of the power source may be a second predetermined time shorter than the first predetermined time.

In the radio communication device of this disclosure, the control unit may lengthen the waiting time according to the OFF state of the power source every time the base station capable of performing radio communication is not found through the scan.

In the radio communication device of this disclosure, the control unit may lengthen the waiting time according to the OFF state of the power source in a case where the number of times of consecutive failures that the base station capable of performing radio communication is not found through the scan is greater than a threshold value.

A vehicle of this disclosure may be equipped with the above-described radio communication device.

A method of controlling a radio communication device of this disclosure is a method of controlling a radio communication device mounted on a vehicle including a power source and including a radio communication unit that performs radio communication with one or more base stations. The method includes steps of causing the radio communication unit to scan for finding the base station capable of performing radio communication, and changing a waiting time until a next scan according to an ON state or an OFF state of the power source in a case where the base station capable of performing radio communication is not found through the scan.

A radio communication system of this disclosure includes a radio communication device mounted on a vehicle including a power source, and one or more base stations. The radio communication device includes a radio communication unit that performs radio communication with the base station, and a control unit that causes the radio communication unit to scan for finding the base station capable of performing radio communication. The control unit changes a waiting time until a next scan according to an ON state or an OFF state of the power source in a case where the base station capable of performing radio communication is not found through the scan.

Advantageous Effects of the Invention

This disclosure provides the radio communication device mounted on the vehicle including the power source and capable of enabling a user to comfortably use the vehicle, the method of controlling the radio communication device.

BRIEF DESCRIPTION OF THE DRAWINGS

The foregoing and additional features and characteristics of this disclosure will become more apparent from the following detailed descriptions considered with the reference to the accompanying drawings, wherein.

DESCRIPTION OF EMBODIMENTS

Hereinafter, the present embodiment will be described with reference to the drawings.

Figure 1:
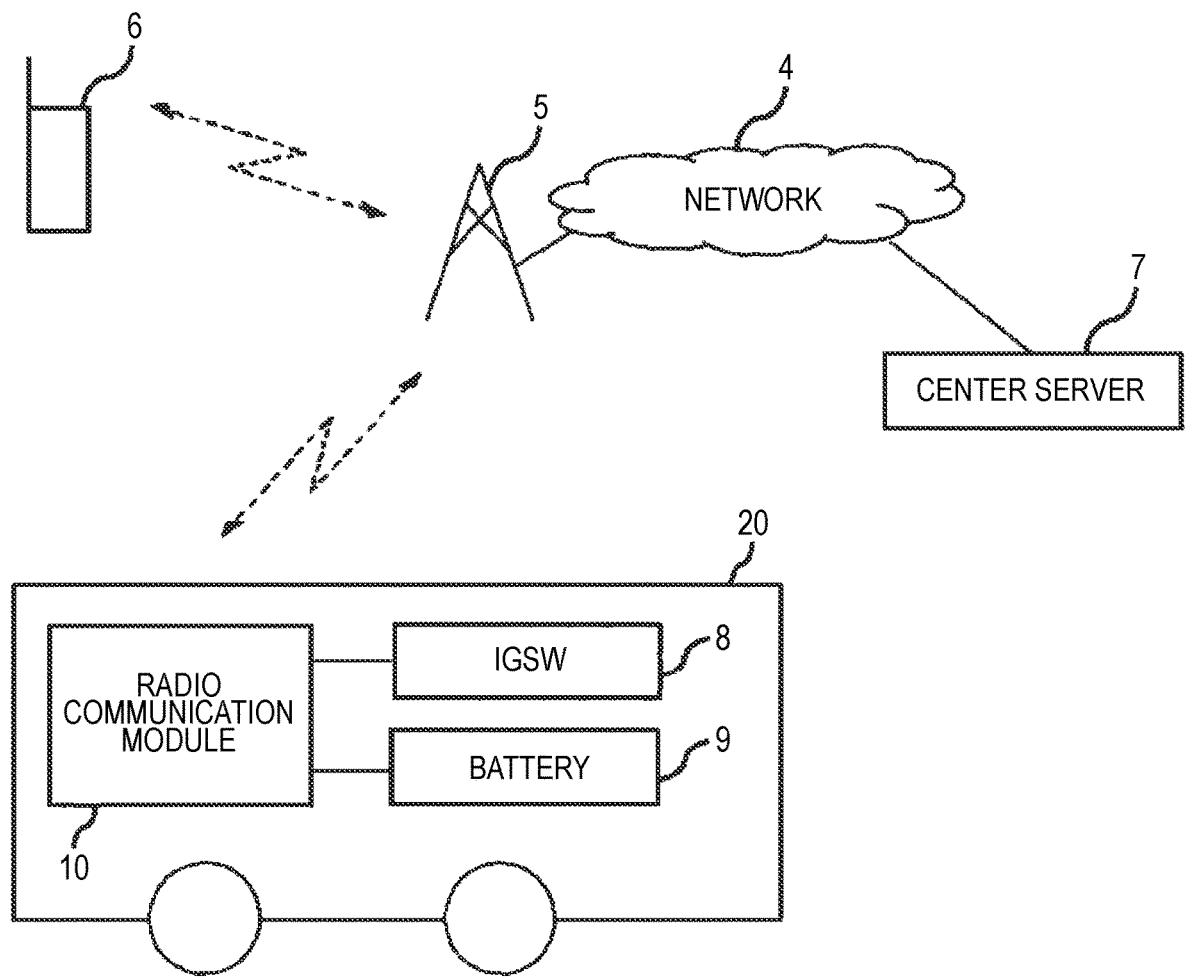
FIG. 1 is a diagram illustrating a radio communication system according to an embodiment.

FIG. 1 is a configuration diagram illustrating a radio communication system according to the present embodiment. The radio communication system shown in FIG. 1 includes a vehicle 20, a network 4, a base station 5, a wireless terminal 6, and a center server 7. Although one base station 5, one wireless terminal 6, and one center server 7 are shown, a plurality of base stations 5, a plurality of wireless terminals 6, and a plurality of center servers 7 may be present.

The vehicle 20 includes an ignition switch (IGSW) 8, a battery 9, and a radio communication module 10. The IGSW 8 and the battery 9 are connected to the radio communication module 10. The radio communication module 10 is mounted on a vehicle including a power source, such as the vehicle 20. As an example of the vehicle including the power source, the vehicle 20 of the present embodiment is described. Of course, the vehicle including the power source may be a vessel including a boat. The radio communication module 10 is included in a radio communication device of this disclosure.

The IGSW 8 is a switch for starting an engine of the vehicle 20 and also a switch for causing the power source of an electric system of the vehicle 20 to be an ON state. Many automobile ignition switches have a configuration to switch to OFF, ACC, ON, and START. In a case where the IGSW 8 is switched to the OFF, electric power is not supplied to the electric system, in a case where the IGSW 8 is switched to the ACC or the ON, the electric power is supplied to the electric system, and in a case where the IGSW 8 is switched to the START, the engine is started by a cell motor rotated by electric power of the battery 9, and the IGSW 8 is returned to the ON.

Hereinafter, in the present embodiment, a state of any one of the ACC, the ON, and the START of the IGSW 8 is described as the power source of the vehicle 20 being in an ON state, and a state of the OFF of the IGSW 8 is described as the power source of the vehicle 20 being in an OFF state.

The battery 9 is for supplying cell motor electric power for starting the engine and for supplying the electric power to the electric system of the vehicle 20 including the radio communication module 10. Even when the power source of the vehicle 20 is in the OFF state (stopped or parked), a user uses radio communication in some cases, and the radio communication module 10 is configured to be operated without depending on whether the power source of the vehicle 20 is in the ON state or the OFF state. However, since a capacity of the battery 9 is limited, in the OFF state, it is preferable that the battery 9 is not consumed much.

The radio communication module 10 is for realizing various functions related to the vehicle 20. For example, a telematics service that provides an information service in real time by combining a vehicle and a communication system is known. In the telematics service, map data or Point Of Interest (POI) data for updating data of a navigation system is downloaded from the center server 7. In the telematics service, diagnosis information of an onboard device is uploaded to the center server 7. The radio communication module 10 performs such download and upload through the network 4.

The radio communication module 10 may correspond to a second generation radio communication method, a third generation radio communication method, or a fourth generation radio communication method such as LTE. The radio communication module 10 may also have a function of performing voice communication with the wireless terminal 6 using VoLTE and a function of executing a program created by a user.

Many telecommunication carriers that operate the network 4 or the base station 5 install base stations by their own and allow the users who have contracted with their own companies to connect with their own base stations to provide a mobile communication service. However, it is difficult to cover communication of all areas (including overseas) with the base station that is able to be prepared only by its own company. Such a communication carrier concludes a roaming contract with a communication carrier of another network so that the radio communication module 10 of the user contracted with the own company is able to also perform communication in an area (base station) under jurisdiction by the communication carrier of the other network.

Figure 2:
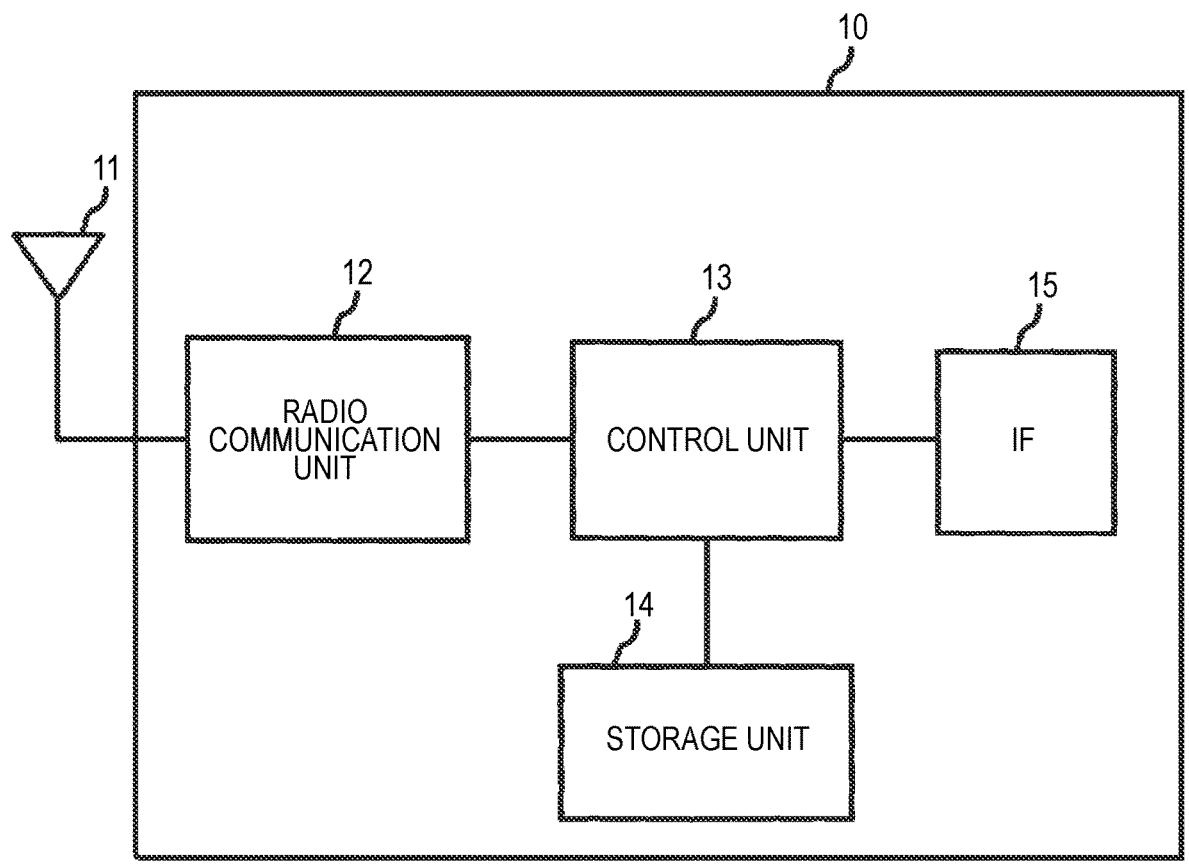
FIG. 2 is a block diagram illustrating a radio communication module according to the embodiment.

FIG. 2 is a block diagram illustrating the radio communication module according to the present embodiment. The radio communication module shown in FIG. 2 includes an antenna 11, a radio communication unit 12, a control unit 13, a storage unit 14, and an interface (IF) 15.

The antenna 11 transmits and receives a wireless signal to and from the base station 5.

The radio communication unit 12 is for radio communication with the base station 5 through the antenna 11. The radio communication unit 12 has an analog signal processing unit or a digital signal processing unit.

In the analog signal processing unit, amplification, analog-digital conversion processing, and the like for the wireless signal received from the antenna 11 are performed, an analog amplification is performed on digital-analog conversion processing and the like for the digital signal transferred from the digital signal processing unit, and the amplified analog signal is transmitted through the antenna 11.

In the digital signal processing unit, data transferred from the control unit 13 is encoded, the encoded data is converted into a digital signal so that the encoded data is able to be transmitted by a communication channel of the wireless signal, the digital signal transferred from the analog signal processing unit is decoded, and the decoded data is transferred to the control unit 13.

The control unit 13 is constituted with a microcomputer as a main body, including a Central Processing Unit (CPU) that executes various programs, a Read Only Memory (ROM), a Random Access Memory (RAM), a backup RAM, an Input/Output (I/O), and the like (all not shown), and executes various kinds of processing by executing various control programs stored in the ROM. The control unit 13 executes processing necessary for controlling the radio communication unit 12.

The storage unit 14 is constituted by an Electronically Erasable and Programmable Read Only Memory (EEPROM) or the like that is able to electrically rewrite a content, and stores a program and information necessary for controlling the radio communication unit 12.

The interface (IF) 15 is an IF of a USB, other IFs, or the like, and is connected to a display, a microphone and a speaker, a navigation system, or the like.

Hereinafter, an operation of the radio communication module according to the present embodiment will be described.

Figure 3:
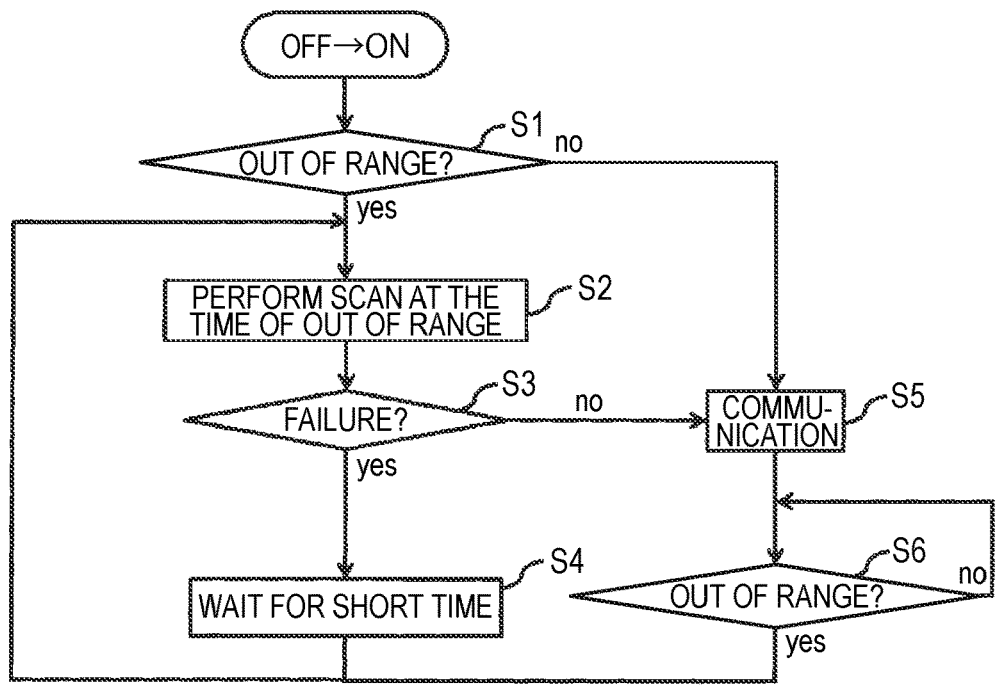
FIG. 3 is a flowchart illustrating a flow of an operation of the radio communication module when the power source of the vehicle according to the embodiment changes from an OFF state to an ON state.

FIG. 3 is a flowchart illustrating a flow of the operation of the radio communication module when the power source of the vehicle according to the present embodiment changes from the OFF state to the ON state.

When the power source of the vehicle 20 is changed from the OFF state to the ON state, the control unit 13 determines whether the radio communication module 10 and the base station 5 are not able to perform the radio communication, that is, whether or not the radio communication module 10 is in a state being an out of range of a radio communication network including the base station 5 (step S1).

When it is determined that the radio communication module 10 is in the out-of-range state (yes of step S1), the control unit 13 causes the radio communication unit 12 to scan for determining whether or not the radio communication module 10 is able to perform the radio communication with the base station 5 without waiting (step S2). The control unit 13 may perform the scan without waiting or may perform the scan after a predetermined time. When the power source of the vehicle 20 is changed from the OFF state to the ON state, since on-vehicle electrical components use the battery 9 at once, the predetermined time may be set to a time until electric power of the battery 9 is stabilized.

When the base station 5 capable of performing radio communication with the radio communication module 10 is not able to be found by the performing of the scan (yes of step S3: scan failure), the control unit 13 waits for a short time (step S4) and tries the scan again (step S2). This is because a possibility that the vehicle 20 is moving and a possibility that the user uses the radio communication module 10 are high. The waiting for the short time will be described later.

When it is determined that the radio communication module 10 is in a within-range state (no of step S1) or when the base station 5 capable of performing radio communication with the radio communication module 10 is able to be found (no of step S3: scan success), the control unit 13 performs the radio communication with the base station 5 (step S5).

After step S5, the control unit 13 determines whether or not the radio communication module 10 is in the out-of-range state (step S6). When it is determined that the radio communication module 10 is in the out-of-range state due to a movement of the vehicle 20 or the like (yes of step S6), the control unit 13 tries the scan again (step S2).

When it is determined that the radio communication module 10 is in the state inside the range (no of step S6), the control unit 13 determines whether or not the radio communication module 10 is in the out-of-range state again (step S6).

Figure 4:
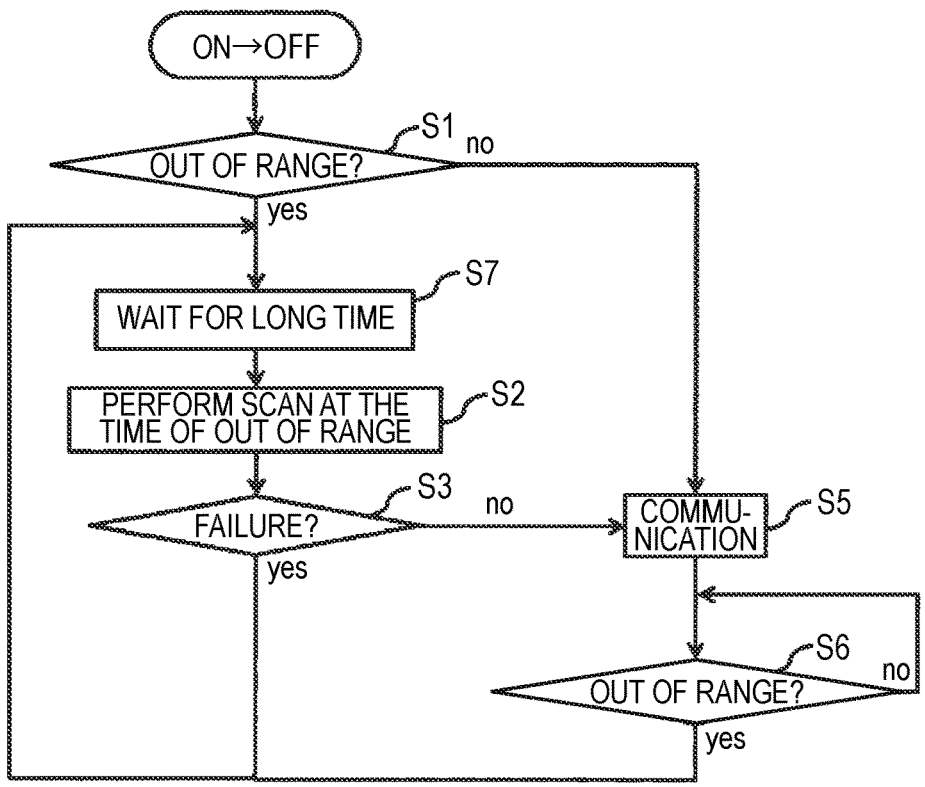
FIG. 4 is a flowchart illustrating a flow of the operation of the radio communication module when the power source of the vehicle according to the embodiment changes from the ON state to the OFF state.

FIG. 4 is a flowchart illustrating a flow of the operation of the radio communication module when the power source of the vehicle according to the present embodiment changes from the ON state to the OFF state. The same reference numerals are given to the same components as those of the radio communication module described with reference to FIG. 3.

When the power source of the vehicle 20 is changed from the ON state to the OFF state, the control unit 13 determines whether the radio communication module 10 and the base station 5 are not able to perform the radio communication, that is, whether or not the radio communication module 10 is in the state being an out of the range of the radio communication network including the base station 5 (step S1).

When it is determined that the radio communication module 10 is in the out-of-range state (yes of step S1), the control unit 13 waits for a long time (step S7). Then, the control unit 13 causes the radio communication unit 12 to scan for determining whether or not the radio communication module 10 is able to perform the radio communication with the base station 5 (step S2). The waiting for the long time will be described later.

When the base station 5 capable of performing radio communication with the radio communication module 10 is not able to be found by the performing of the scan (yes of step S3: scan failure), the control unit 13 waits for a long time (step S7). A purpose of waiting for the long time is to prevent the control unit 13 from consuming the battery 9 much when the power source of the vehicle 20 is in the OFF state. It is also to prevent interference of other wireless devices by waiting for the long time. When the power source of the vehicle 20 is in the OFF state, the vehicle 20 is normally stopped or parked. However, the vehicle 20 is moving even in the state in which the power source of the vehicle 20 is in the OFF state, for example, the vehicle 20 is shipped and exported, in some cases. Therefore, the radio communication module 10 performs the scan even in the state in which the power source of the vehicle 20 is in the OFF state. Since there is a case where a radio communication environment around the radio communication module 10 is changed or the like, the radio communication module 10 performs the scan even in the state in which the power source of the vehicle 20 is in the OFF state.

When it is determined that the radio communication module 10 is in the state inside the range (no of step S1) or when the base station 5 capable of performing radio communication with the radio communication module 10 is able to be found (no of step S3: scan success), the control unit 13 performs the radio communication with the base station 5 (step S5).

After step S5, the control unit 13 determines whether or not the radio communication module 10 is in the out-of-range state (step S6). When it is determined that the radio communication module 10 is in the out-of-range state due to a movement of the vehicle 20 or the like (yes of step S6), the control unit 13 waits for a long time (step S7).

When it is determined that the radio communication module 10 is in the state inside the range (no of step S6), the control unit 13 determines whether or not the radio communication module 10 is in the out-of-range state again (step S6).

Each of the waiting time for the short time (the waiting time corresponding to the ON state of the power source of the vehicle 20) and the waiting time for the long time (the waiting time corresponding to the OFF state of the power source of the vehicle 20) may be a predetermined time. The waiting time for the short time is shorter than the waiting time for the long time. For example, such waiting times are stored in the storage unit 14 in advance. For example, the waiting time for the short time may be one second or shorter than one second, and shortness thereof is not limited. The waiting for the long time may be much longer than the waiting for the short time. For example, the long time may be several hours, several days, or several months, and length thereof is not limited. Data for using the waiting of the short time and the long time may be stored in the storage unit 14.

Each of the waiting time for the short time and the waiting time for the long time may be variably set. For example, the control unit 13 may increase the waiting time for the long time every time the base station capable of performing radio communication is not able to be found through the scan. In a case where the number of consecutive scan failure is greater than a threshold value, the control unit 13 may increase the waiting time for the long time. The same is applied to the waiting time for the short time. Since a possibility of the scan failure is high as the number of the scan failures increases, the radio communication module 10 can prevent an unnecessary scan by increasing the waiting time for the long time.

As described above, the radio communication unit 10 scans to find the base station 5 capable of performing radio communication and changes the waiting time until the next scan according to the ON state or the OFF state of the power source when the base station 5 capable of performing radio communication with the radio communication unit 10 is not found through the scan. In a case where the power source of the vehicle 20 is in the OFF state, the radio communication module 10 preferably does not consume the battery 9 much in the state in which the power source of the vehicle 20 is in the OFF state. However, the radio communication module 10 increases the waiting time so as to be longer than the waiting time when the power source of the vehicle 20 is in the ON state, and thus it is possible to enable the battery 9 of the vehicle 20 to last longer.

This application is based upon and claims the benefit of priority from Japanese Patent Application No. 2016-236681, filed Dec. 6, 2016, the entire contents of which are incorporated herein by reference.

INDUSTRIAL APPLICABILITY

This disclosure can provide a radio communication device capable of enabling a user to comfortably use the vehicle, a method of controlling the radio communication device, and a radio communication system.

REFERENCE SIGNS LIST 4 network
5 base station
6 wireless terminal
7 center server
8 IGSW
9 battery
10 radio communication module
11 antenna
12 radio communication unit
13 control unit
14 storage unit
15 IF
20 vehicle

The invention claimed is:

1. A radio communication device mounted on a vehicle including a power source, the radio communication device comprising:
a radio transceiver that performs radio communication with one or more base stations; and
a controller that causes the radio transceiver to scan to find the base station capable of performing radio communication, wherein
the controller changes a waiting time until a next scan according to an ON state or an OFF state of the power source in a case where the base station capable of performing radio communication is not found through the scan, and
when the power source is in the OFF state and the radio communication device is changed from a within-range state where the radio communication with the base station is possible to an out-of-range state where the radio communication with the base station is not possible, the controller causes the radio transceiver to perform the scan after waiting by the waiting time according to the OFF state of the power source.

2. The radio communication device according to claim 1, wherein
the waiting time according to the OFF state of the power source is a first predetermined time and the waiting time according to the ON state of the power source is a second predetermined time shorter than the first predetermined time.

3. The radio communication device according to claim 1, wherein
the controller lengthens the waiting time according to the OFF state of the power source every time the base station capable of performing radio communication is not found through the scan.

4. The radio communication device according to claim 1, wherein
the controller lengthens the waiting time according to the OFF state of the power source in a case where the number of times of consecutive failures that the base station capable of performing radio communication is not found through the scan is greater than a threshold value.

5. A vehicle equipped with the radio communication device according to claim 1.

6. A radio communication device mounted on a vehicle including a power source, the radio communication device comprising:
a radio transceiver that performs radio communication with one or more base stations; and
a controller that causes the radio transceiver to scan to find the base station capable of performing radio communication, wherein
the controller changes a waiting time until a next scan according to an ON state or an OFF state of the power source in a case where the base station capable of performing radio communication is not found through the scan, wherein
when the power source is in the ON state and the radio communication device is changed from a within-range state where the radio communication with the base station is possible to an out-of-range state where the radio communication with the base station is not possible, the controller causes the radio transceiver to perform the scan after waiting by the waiting time according to the ON state of the power source.

7. A method of controlling a radio communication device mounted on a vehicle including a power source and including a radio transceiver that performs radio communication with one or more base stations, the method comprising:
causing the radio transceiver to scan for finding the base station capable of performing radio communication;
changing a waiting time until a next scan according to an ON state or an OFF state of the power source in a case where the base station capable of performing radio communication is not found through the scan; and
when the power source is in the OFF state and the radio communication device is changed from a within-range state where the radio communication with the base station is possible to an out-of-range state where the radio communication with the base station is not possible, causing the radio transceiver to perform the scan after waiting by the waiting time according to the OFF state of the power source.

8. A radio communication system including:
a radio communication device mounted on a vehicle including a power source; and
one or more base stations,
the radio communication device including
   a radio transceiver that performs radio communication with the base station, and
   a controller that causes the radio transceiver to scan to find the base station capable of performing radio communication,
the controller changing the waiting time until next scan according to an ON state or an OFF state of the power source in a case where the base station capable of performing radio communication is not found through the scan, and
when the power source is in the OFF state and the radio communication device is changed from a within-range state where the radio communication with the base station is possible to an out-of-range state where the radio communication with the base station is not possible, the controller causes the radio transceiver to perform the scan after waiting by the waiting time according to the OFF state of the power source.

* * * * *